United States Patent

[11] 3,618,977

[72] Inventors Edwin H. Klove, Jr.
Bloomfield Hills;
James L. Noll, Livonia, both of Mich.
[21] Appl. No. 35,954
[22] Filed May 11, 1970
[45] Patented Nov. 9, 1971
[73] Assignee General Motors Corporation
Detroit, Mich.

[54] INFLATABLE OCCUPANT RESTRAINT
1 Claim, 5 Drawing Figs.
[52] U.S. Cl. .................................................... 280/150 AB
[51] Int. Cl. ....................................................... B60r 21/10
[50] Field of Search............................................ 280/150;
206/DIG. 30, 19.5; 244/122 R

[56] References Cited
UNITED STATES PATENTS
2,834,606  5/1958  Bertrand ...................... 280/150
3,473,824  10/1969  Carey et al..................... 280/150
3,477,740  11/1969  Hass.............................. 280/150
3,514,125  5/1970  Nemecek ....................... 280/150
FOREIGN PATENTS
953,312  3/1964  Great Britain................. 280/150

Primary Examiner—Kenneth H. Betts
Attorneys—W. E. Finken and Herbert Furman

ABSTRACT: A vehicle includes a seat having a seat cushion and a seat back for supporting an occupant in seated position, an instrument panel having a frontal surface located in spaced juxtaposed relationship to the seat back and a lower surface located above the level of the seat cushion and forwardly of the occupant's knees. A source of pressure fluid on the vehicle communicates with a diffuser tube located adjacent the lower surface of the instrument panel. The pressure fluid is releasable in response to the vehicle receiving an acceleration pulse of predetermined amplitude and time. An inflatable cushion of generally tear drop shape longitudinally of the vehicle has its apical end mounted on the vehicle and communicating with the diffuser tube. When inflated by the pressure fluid, the cushion deploys rearwardly and upwardly. The upper and lower walls of the cushion flare outwardly with respect to each other from the apical end of the cushion, with the upper wall engaging the frontal surface of the instrument panel and the lower wall engaging the knees and upper leg portions of the seated occupant. These walls are interconnected by an end wall of arcuate cross section which tangentially engages the torso of the seated occupant and extends arcuately away from the torso in spaced relationship to the head of the occupant. Sidewalls interconnect the upper, lower and end walls of the cushion.

INVENTORS
Edwin H. Klove, Jr. &
BY James L. Noll

Herbert Furman
ATTORNEY

INFLATABLE OCCUPANT RESTRAINT

This invention relates to an occupant restraint for vehicles and more particularly to an inflatable cushion of predetermined shape for restraining movement of a seated occupant relative to the instrument panel of the vehicle when the vehicle and occupant are subjected to acceleration pulses of predetermined amplitude and time.

Inflatable cushion restraint systems for vehicle occupants are well known and generally include a source of pressure fluid, a sensor controlling the release of the pressure fluid when the vehicle receives an acceleration pulse of predetermined amplitude and time, and a manifold for receiving the released pressure fluid and distributing it to an inflatable cushion to inflate the cushion in the space between the occupant and the frontal surface of the instrument panel of the vehicle.

When deflated the cushion is conventionally accordion pleated generally symmetrically about the manifold and located in general alignment with or normal to the torso or head of the occupant at about the vertical center of the frontal surface of the instrument panel. Thus, when the cushion is inflated, it is deployed in a direction such that the initial engagement of the cushion is with the seated occupant's torso or head, depending on the stature or percentile of the seated occupant and his seated attitude, and the cushion does not apply any downward and/or rearward component of force to the upper leg portions of the seated occupant so that it is possible for the occupant to submarine or move underneath the cushion when the vehicle and the seated occupant are subjected to acceleration pulses which exceed a predetermined amplitude and time.

The air cushion of this invention obviates these disadvantages by providing a cushion which is deployed in a predetermined direction and assumes a predetermined shape when inflated. Generally, the cushion is of tear drop cross-sectional shape longitudinally of the vehicle and is deployed rearwardly and upwardly from below the frontal surface of the instrument panel of the vehicle. The upper and lower wall portions of the cushion flare outwardly with respect to each other from the apical end of the cushion which is mounted on the vehicle about the diffuser tube. The upper wall portion engages the instrument panel of the vehicle and the lower wall portion engages the knees and upper leg portions of the seated occupant to thereby fill the space between the seated occupant and the instrument panel and also apply a rearward and downward component of force to the seated occupant. The end wall portion joining the upper and lower wall portions is of arcuate cross section, tangentially engages the torso of the seated occupant, and extends arcuately away from the torso of such occupant in spaced relationship to the occupant's head. While the cushion is intended to tangentially engage the torso of a 95th percentile male, the cushion will perform equally as well with other percentile male or female, due to its shape and direction of deployment with respect to the occupant.

One feature of this invention is that it provides an improved occupant restraint including an inflatable cushion of generally tear drop cross-sectional shape longitudinally of the vehicle and being deployed rearwardly and upwardly of the vehicle with respect to a seated occupant, with the outwardly flaring upper and lower wall portions of the cushion respectively engaging the frontal surface of the instrument panel and the knees and upper leg portions of a seated occupant to apply a rearward and downward component of force to the occupant and an arcuately shaped end wall portion joining the upper and lower wall portions tangentially engaging the torso of such occupant.

This and other features of the occupant restraint of this invention will be readily apparent from the following specification and drawings wherein.

Figure 1:
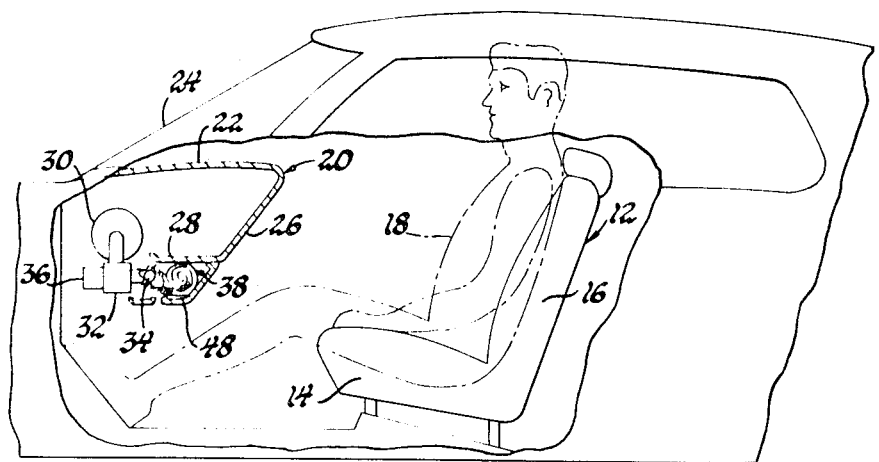
FIG. 1 is a partial view of a vehicle having an air cushion restraint system mounted thereon and including an inflatable cushion according to this invention, with the cushion being shown in a deflated stored position.
Figure 2:
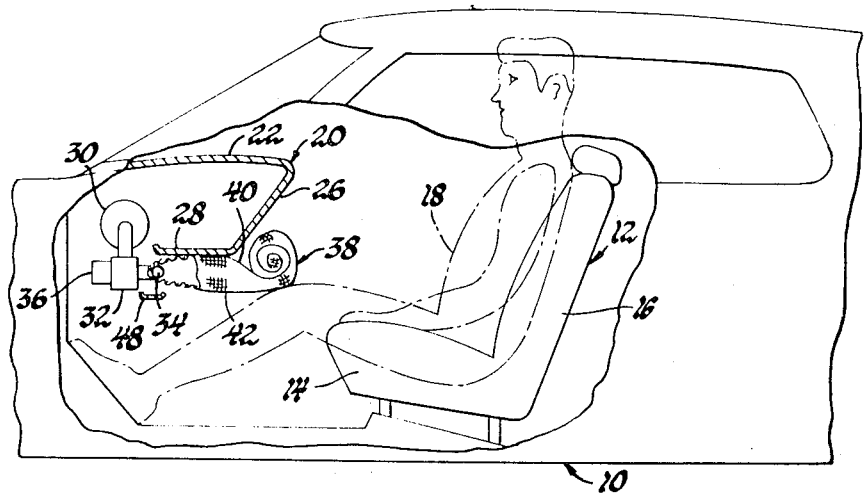
FIG. 2 is a view similar to FIG. 1 showing the cushion in a partially inflated and deployed position.

Referring now to FIG. 1 of the drawings, a vehicle designated generally 10 includes a front seat 12 having a seat cushion 14 and a seat back 16. At right-hand passenger or occupant 18 is supported in a seated position on the seat 12. The occupant 18 shown is a 95th percentile male.

The instrument panel 20 of the vehicle includes an upper surface 22 facing the windshield 24, a frontal surface 26 in generally spaced juxtaposed relationship to the torso of the occupant 18, and a lower surface 28.

A diaphragm sealed pressure vessel 30 containing a supply of fluid under pressure is located within the instrument panel 20 and communicates with a manifold arrangement 32. The manifold arrangement in turn communicates with a diffuser tube 34 which extends generally transversely of the vehicle underneath the lower surface 28 of the instrument panel. A sensor 36 senses acceleration pulses applied to the vehicle 10 and when a pulse of predetermined amplitude and time is received, the sensor provides for rupture of the sealing diaphragm of the pressure vessel 30 to release the supply of pressure fluid to the manifold arrangement 32 and diffuser tube 34.

An inflatable cushion or occupant restraint 38 according to this invention is in communication with the diffuser tube 34 and is inflated by such tube when the pressure fluid of the vessel 30 is released.

Figure 3:
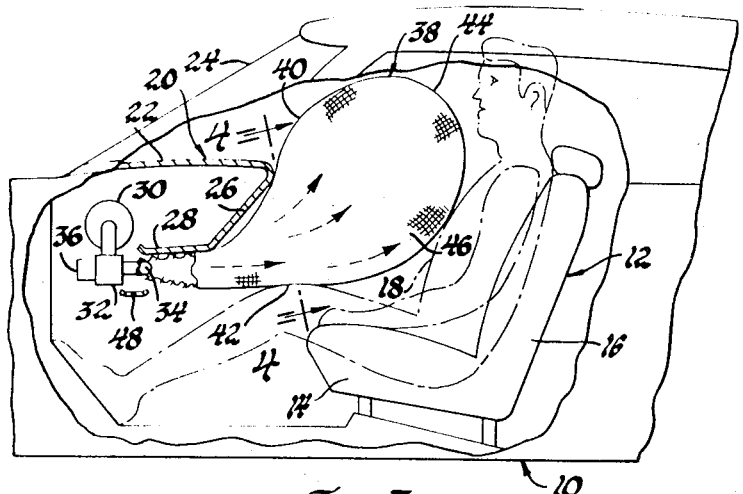
FIG. 3 is a view similar to FIG. 1 showing the cushion in a fully inflated and deployed position.
Figure 4:
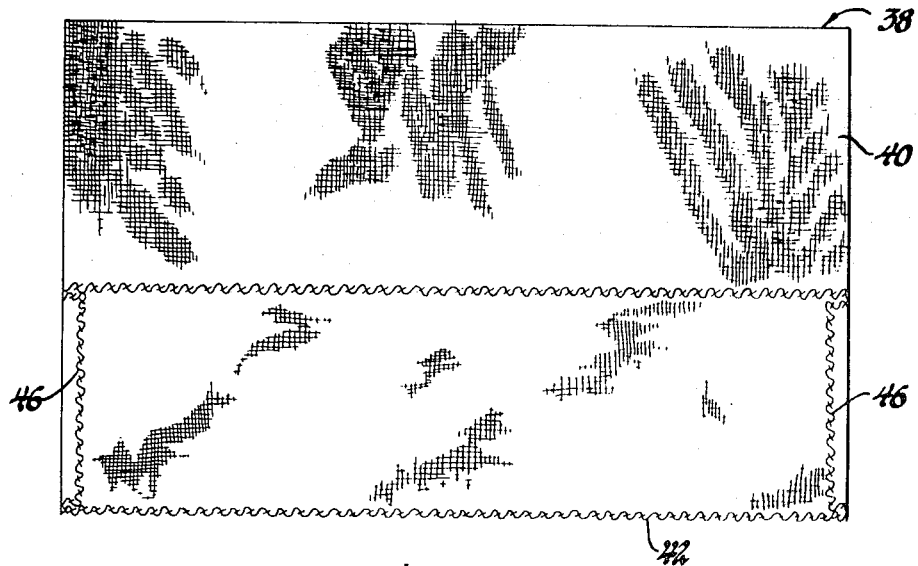
FIG. 4 is a sectional view taken generally along the plane indicated by line 4—4 of FIG. 3.
Figure 5:
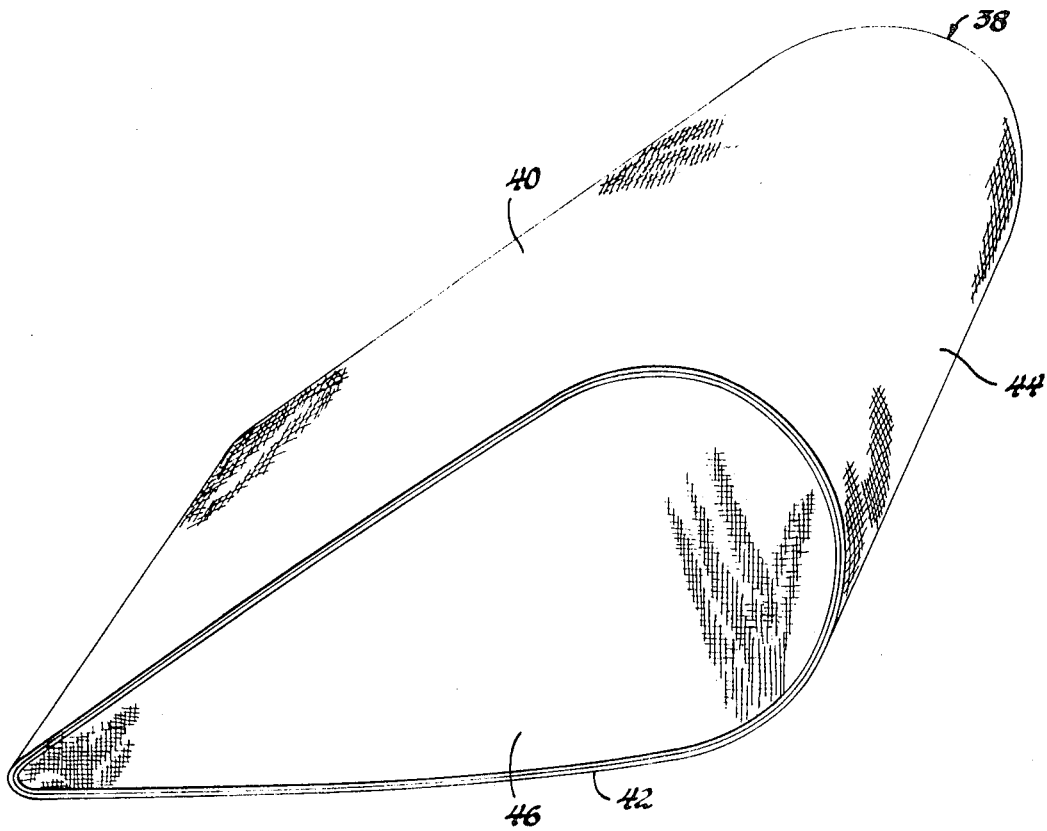
FIG. 5 is a perspective view.

As best shown in FIG. 3, the cushion 38 is generally of tear drop cross-sectional shape longitudinally of the vehicle. The apical end of the cushion is mounted about the diffuser tube 34 in a conventional manner to mount the cushion on the vehicle below the frontal surface 26 of the instrument panel. The upper wall portion 40 and the lower wall portion 42 of the cushion 38 flare outwardly with respect to each other longitudinally rearwardly of the vehicle. An end wall portion 44 of the cushion of generally arcuate cross section joins the wall portions 40 and 42. Generally planar sidewall portions 46 face transversely of the vehicle and are joined to the edges of the wall portions 40, 42 and 44 to complete the cushion.

When the cushion is inflated and fully deployed as shown in FIG. 3, it will be noted that the direction of deployment is generally rearwardly and upwardly of the vehicle and of the occupant 18. The upper wall portion 40 of the cushion engages the frontal surface 26 of the instrument panel as well as a portion of the lower surface 28 of the panel. The lower wall portion 42 engages both the knees and upper leg portions of the seated occupant 18 to apply a rearward and downward component of force to the occupant and thereby resist submarining of the occupant or movement of the occupant underneath the cushion 38. The arcuate end wall portion 44 tangentially engages the upper portion of the torso of the occupant 18, and it will be noted that this wall portion extends arcuately forwardly and away from the occupant's torso in spaced relationship to his head.

Since the cushion is deployed rearwardly and upwardly from below the frontal surface 26 of the instrument panel and between such surface and the occupant's knees, the first contact of the cushion is with the occupant's knees.

While the occupant 18 is shown as a 95th percentile male, it is believed apparent that the cushion will work equally as well with other percentile males and females and will also work equally as well if the occupant is not in the proper seated attitude at the time the cushion is inflated and deployed.

As shown in FIG. 1, the cushion 38 is stored in a rolled condition within a housing 48 when deflated. Although the unrolling of the cushion with respect to the occupant has certain advantages as fully set forth and claimed in copending application A-14,426, Ser. No. 36,080, filed May 11, 1970, and assigned to the assignee of this invention, the cushion could be stored as well in an accordion pleated arrangement. Briefly, upon deployment of the cushion 38 from its FIG. 1 position to its FIG. 3 position, the upper and lower walls of the cushion walk up the frontal surface of the instrument panel and the knees and the upper leg portions of the occupant as the cushion unrolls. The final deployed shape of the cushion, as shown in FIG. 3, results from such unrolling and normally applies the proper components of force to the occupant 18 and, of course, fills the space between the occupant and the frontal surface 26 of the instrument panel.

The sidewall portions 46 of the cushion 38 are located parallel to each other and also to the longitudinal center line of the vehicle. However, it should be noted that such wall portions can be located angularly with respect to each other and to the center line of the vehicle or parallel to each other and angularly to the centerline of the vehicle. For example, in certain installations, the cushion 38 may be intended for use by both the right-hand and the center front seat passengers and the diffuser tube 36 may not extend fully across the seating area occupied by both passengers. In such instances, the left-hand sidewall portion 46 of the cushion may have to be angularly located with respect to the longitudinal centerline of the vehicle to ensure that the end wall portion 44 may be in a position to be engaged by the center seat passenger.

Although not shown, the cushion 38 may be provided with various types of controls for releasing the fluid contained therein upon impact of the cushion by a seated occupant.

Thus, this invention provides an improved occupant restraint.

I claim:

1. In combination with a vehicle including a seat having a seat cushion and a seat back for supporting an occupant in seated position, an instrument panel having a frontal surface juxtaposed to the seat back and torso of the seated occupant, and a source of pressure fluid releasable in response to the vehicle receiving an acceleration pulse of predetermined amplitude and time, an occupant restraint comprising, a cushion inflated by the pressure fluid and being of generally tear drop cross-sectional shape longitudinally thereof, means mounting the cushion adjacent the apical end thereof on the vehicle below the frontal surface of the instrument panel for deployment rearwardly and upwardly of the seated occupant upon inflation of the cushion by the pressure fluid, the cushion having upper and lower generally planar wall portions flaring outwardly with respect to each other generally longitudinally of the vehicle and joined by an end wall portion of arcuate cross section facing the seated occupant, sidewall portions facing generally transversely of the vehicle and joined to the upper, lower and end wall portions adjacent the edge portions thereof, the upper wall portion of the cushion engaging the frontal surface of the instrument panel, the lower wall portion of the cushion engaging the knees and upper leg portions of the seated occupant, and the arcuate end wall portion generally tangentially engaging the torso of the seated occupant and extending arcuately away therefrom in spaced relationship to the head of the seated occupant, the cushion applying a downward and rearward force on the seated occupant and filling the space between the frontal surface of the instrument panel and the upper leg portions and torso of the seated occupant.

* * * * *

PO-1050
(5/69)

UNITED STATES PATENT OFFICE
CERTIFICATE OF CORRECTION

Patent No. 3,618,977          Dated November 9, 1971

Inventor(s) Edwin H. Klove, Jr. and James L. Noll

It is certified that error appears in the above-identified patent and that said Letters Patent are hereby corrected as shown below:

The following reference should be added under "UNITED STATES PATENTS": -- 3,414,292   12/1968   Oldberg et al   280/150 --.

Column 2, line 10, "At" should read -- A --.

Signed and sealed this 25th day of April 1972.

(SEAL)
Attest:

EDWARD M. FLETCHER, JR.          ROBERT GOTTSCHALK
Attesting Officer          Commissioner of Patents